Patented Sept. 15, 1953

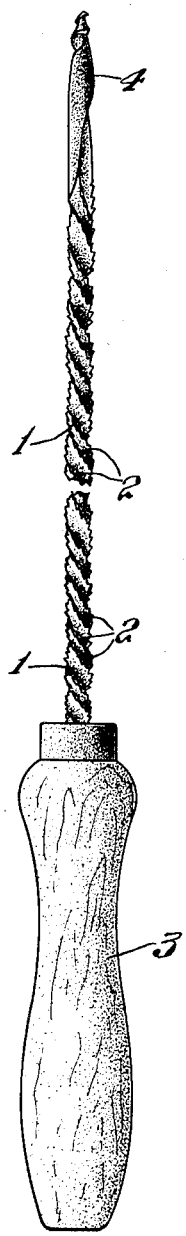
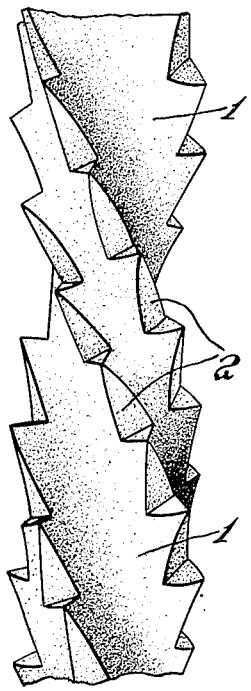
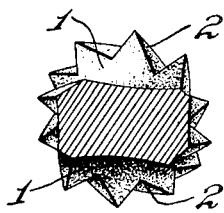

2,652,075

UNITED STATES PATENT OFFICE 2,652,075

SAWING, CUTTING, AND RASPING TOOL FOR WOODWORKING

Günter Mannes, Remscheid, Germany, assignor to F. Aug. Honneknovel, Remscheid-Bliedinghausen, Germany, a firm Application October 27, 1950, Serial No. 192,501
In Germany November 15, 1948

2 Claims. (Cl. 143—133)

The present invention relates to cutting tools and is especially directed to a cutting, sawing and rasping tool of novel construction to be used particularly for the working of wood.

The new tool consists of a twisted multi-edged steel rod provided with pyramidically pointed saw teeth and terminating at one end in a borer. The tool can be resharpened and is produced from a steel rod of flat rectangular cross-section which prior to the twisting is provided on each of its edges with a row of the aforesaid pyramidically pointed teeth, so that the tool after the twisting has been effected is provided with two rows of teeth arranged closely beside each other and thus forming a double row of teeth, and a deep and wide channel for cuttings or chips positioned between two adjacent double rows of teeth.

Multi-edged all-round cutting steel rods which at one end terminate in a borer and which at the cutting portion of their shaft are of the same or slightly smaller diameter than the borer have already been known to the art. These known cutting tools are provided on their sharp edges with conically pointed saw teeth, whose bases are formed by the sides of the twisted multi-edged rod extending at a right or acute angle with respect to each other. It has further been proposed to employ multi-edged rods whose cross-section prior to the twisting is either of a flat, elliptical, trapezoidal, parallelogrammic or sword-shaped cross-section. If flat rods of this kind are being used the saw teeth can easily be resharpened in the same way as the teeth of ordinary flat saws are resharpened. According to still another suggestion the flat sides of the aforedescribed known tools have likewise been provided with teeth of equal or smaller size and height than the teeth positioned on the edges, whereby either the entire multi-edged rod or only a portion of the latter may be twisted.

However, these known tools have the disadvantages that, if they are of quadrangular cross-section, they can not be resharpened, and that, if they are of elliptical or parallelogrammic cross-section, they cut into the material with such sharpness that an additional finishing treatment is necessary.

But the most serious drawback of all of these known tools is the absence of a channel for the chips or shavings, so that the teeth of these tools will easily get clogged with the cuttings when the working is done in wood, leather, artificial material, light metal or the like. It is understood that because of this absence of a chip channel the cutting speed can likewise be only a comparatively small one.

In the present invention all of these disadvantages are obviated in a simple and efficient way. According to the invention the cutting tool consists of a steel rod which in non-twisted state is of flat rectangular cross-section, having on each of its edges a row of pyramidic teeth, so that after the twisting has been effected the rod is provided with two rows of teeth arranged closely beside each other and thus forming a double row of teeth, and a deep and wide channel for cuttings or chips positioned between two adjacent double rows of teeth.

The invention will be best understood from a consideration of the following detailed description, taken in connection with the accompanying drawings, forming a part of this specification with the understanding however, that the invention is not confined to any strict conformity with the showing of the drawings, but may be changed or modified, so long as such changes or modifications mark no material departure from the salient features of the invention as expressed in the appending claims.

In the embodiment illustrated in the drawings:

Fig. 1 is an elevational view of the cutting tool showing the double rows of teeth and the deep and wide channels for chips or shavings positioned between the double rows;

Fig. 2 is a fractional elevational view on an enlarged scale of the twisted tool clearly showing the double rows and the chip-channels;

Fig. 3 is a cross-section on an enlarged scale of the tool of Fig. 1.

Like other tools of this kind, the tool of the present invention is manufactured from a multiedged steel rod. In the embodiment illustrated in the drawings it has been produced from a four-edged steel-rod of flat rectangular cross-section. The four edges of the non-twisted rod have been provided in known manner with the teeth 2 of pyramidic shape cut into the steel either by hand or with the aid of machinery. The teeth 2 extend almost over the entire length of the rod. After the teeth have been cut, the rod is helically twisted in likewise known manner. The result of the twisting is the herein disclosed cutting tool provided with pointed saw teeth.

The tool of the invention differs from similar known tools of this kind in that it is provided with two rows of teeth arranged closely beside each other and thus forming a double row of teeth, and a deep and wide channel for cuttings or chips positioned between two adjacent double rows of teeth. A deep and wide chip-channel like this has never been known before for tools of this kind.

Owing to this novel arrangement of the double rows of teeth 2 on the edges of the narrow sides of the rod, which results in expanding and rising of the teeth when the rod is being twisted, and owing to the extraordinary depth and width of the chip-channel 1, the efficiency of the novel cutting tool has been enormously increased, as the double rows of teeth more readily cut into the material and do not get clogged with the cuttings, which through the deep and wide chip-channel can easily slide away from the workpiece.

Tests made with cutting tools arranged in a machine saw have shown that the cutting efficiency of a tool provided with a chip-channel as disclosed in the present invention surpasses the cutting efficiency of a similar known tool not provided with a chip-channel by at least 100%.

Another considerable advantage of the new tool resides in the feature that the teeth 2, in spite of their arrangement in double rows, can be resharpened, which with similar known tools is impossible. Furthermore, the flat four-edged cross-section results in an increased elasticity, and consequently also in a prolonged life-time of the new tool.

The upper portion of the tool terminates in known manner in a borer 4 needed for piercing the material, such as wood, artificial material, leather, light metal and the like, prior to the application of the saw-like tool for sawing out the desired bores, profiles or the like.

It is understood that instead of terminating in a borer, the new cutting tool may also be provided with an ordinary pointed end, or with a four-edged point, a center bit or the like. The tool is fastened in a handle or grip 3 of any suitable shape.

Regarding the steel rod used in the manufacture it may be said that the long side of its flat rectangular cross-section should be at least twice as long as the short side thereof.

What I claim as new and desire to secure by Letters Patent of the United States is:

1. Improved sawing, cutting and rasping tool, particularly for use in woodworking, comprising a flat rectangular steel bar having alternate sides of substantially different lengths and being twisted about its axis, said bar having saw teeth of substantially pyramidical shape extending along the four edges thereof, said teeth pointing in the same direction and being arranged in two pairs of continuous helical rows, said four rows of teeth being parallel, the rows of each pair being closed spaced beside each other with two relatively wide and deep channels running between and parallel to said pairs, the width of the channels being substantially wider than the distance between the rows of teeth of any one of said pairs, the depth of the channels causing the teeth to protrude substantially.

2. Improved sawing, cutting and rasping tool according to claim 1, wherein the bar has a rectangular cross section, with the long side of the rectangle being at least twice as long as the short side.

GÜNTER MANNES.

References Cited in the file of this patent.

UNITED STATES PATENTS

| Number | Name | Date |
|---|---|---|
| 152,970 | Chase | July 14, 1874 |
| 2,101,583 | Honneknovel | Dec. 7, 1937 |
| 2,480,648 | Harer | Aug. 30, 1949 |

FOREIGN PATENTS

| Number | Country | Date |
|---|---|---|
| 87,294 | Sweden | Sept. 8, 1936 |